United States Patent
Collart et al.

(10) Patent No.: US 7,732,049 B2
(45) Date of Patent: Jun. 8, 2010

(54) PELLETS FOR SE ENCAPSULATION

(75) Inventors: Olivier Collart, Jumet (BE); Benoit Cherdon, Jumet (BE); Pierre Carleer, Jumet (BE)

(73) Assignee: AGC Glass Europe, Brussels (BE)

( * ) Notice: Subject to any disclaimer, the term of this patent is extended or adjusted under 35 U.S.C. 154(b) by 0 days.

(21) Appl. No.: 12/090,524

(22) PCT Filed: Oct. 17, 2006

(86) PCT No.: PCT/EP2006/067502

§ 371 (c)(1),
(2), (4) Date: Aug. 20, 2008

(87) PCT Pub. No.: WO2007/045654

PCT Pub. Date: Apr. 26, 2007

(65) Prior Publication Data

US 2008/0312061 A1    Dec. 18, 2008

(30) Foreign Application Priority Data

Oct. 18, 2005    (EP) .................................. 05109699

(51) Int. Cl.
*B32B 9/00*    (2006.01)
*C04B 35/00*    (2006.01)
*C03C 4/00*    (2006.01)

(52) U.S. Cl. ................. 428/402.24; 428/402; 428/403; 428/404; 428/406; 106/286.8; 106/237.34; 106/600; 106/623; 501/27; 501/32; 501/55; 501/72; 65/21.4

(58) Field of Classification Search ................. 428/402, 428/402.21, 403, 406, 404; 106/286.8, 237.34, 106/600, 623; 501/27, 32, 55, 72; 65/21.4
See application file for complete search history.

(56) References Cited

U.S. PATENT DOCUMENTS

| 2,414,413 | A | | 1/1947 | Pavlish et al. | |
| 3,628,932 | A | * | 12/1971 | Inoue et al. | .................. 65/17.5 |
| 5,385,593 | A | | 1/1995 | Longobardo | |
| 2003/0078155 | A1 | | 4/2003 | Landa et al. | |

FOREIGN PATENT DOCUMENTS

| DE | 2813322 | | 10/1979 |
| EP | 1586543 | | 10/2005 |
| GB | 1036477 | | 7/1966 |
| JP | 06-183779 | * | 7/1994 |

* cited by examiner

*Primary Examiner*—Gwendolyn Blackwell
(74) *Attorney, Agent, or Firm*—Oblon, Spivak, McClelland, Maier & Neustadt, L.L.P.

(57) ABSTRACT

Pellets encapsulating selenium or a compound of selenium comprise one hollow cavity filled with the selenium surrounded by a matrix which is able to form an eutectic with at least one of the constituents of a batch of molten raw materials for the manufacture of glass.

15 Claims, No Drawings

PELLETS FOR SE ENCAPSULATION

CROSS REFERENCE TO RELATED APPLICATIONS

This application is the entry into the United States of PCT Application Number PCT/EP2006/067502 filed Oct. 17, 2006 and claims priority from European Patent Application No. EP/05109699.8 filed Oct. 18, 2005, the entirety of each of which is hereby incorporated by reference.

SUMMARY OF THE INVENTION

This invention relates to pellets materials comprising selenium. More precisely, it relates to pellets that encapsulate selenium and/or at least a selenium compound. In particular, the invention relates also to pellets encapsulating selenium that can be incorporated to a batch mixture of components suitable for glass melting manufacturing processes.

According to a first aspect, the invention provides pellets encapsulating selenium and/or at least one selenium compound.

According to a second aspect, the invention provides a process for the manufacture of the pellets.

According to a third aspect, the pellets according to the invention are used as a selenium raw material for incorporating selenium into a glass molten batch.

According to a fourth aspect, the invention provides a method for reducing selenium burn off in a selenium comprising glass making process.

According to a fifth aspect, the invention provides a soda lime glass comprising selenium.

Dependent claims define further preferred embodiments of the invention.

The present invention may provide one or more of the following advantages:
- Simple mechanical method of preparation of the pellets;
- simplicity of incorporation of the Se, like any other traditional glass component;
- no requirement for any special and/or particularly expensive dispenser or dosing equipment for the incorporation of the Se component in a batch of raw materials;
- access to new high Se glass formulae.

DETAILED DESCRIPTION

Pellets are small pieces of material of any shape, having at least 1 cm in their largest dimension. Most often, they have at least 0.5 cm in their largest dimension. Generally, they do not exceed 20 cm for that largest dimension. Preferably, pellets are of parallelepipedic, cubic or cylindrical shape. Pellets according to the invention are composed of two parts: one hollow cavity filled with a heart of selenium and/or at least one selenium compound and a matrix surrounding the filled hollow cavity, which hides and isolates the heart from the pellet environment. The matrix, according to the invention, is a compressed tablet that does not melt below 1300° C. under normal atmospheric pressure. The matrix must be free from any compound which could give rise to a gaseous compound when heated from atmospheric temperature up to 2000° C. It must as well be able to slowly form an eutectic product with at least one of the constituents of a batch of molten raw materials commonly used in a glass manufacturing process, when dipped into said molten glass raw materials batch. The eutectic product has a melting temperature of from 400 to 1800° C. under normal pressure.

The heart of selenium and/or at least one Se compound is selected from metallic selenium, inorganic and organic salts, as well as other organic compounds comprising selenium in their molecule. In particular, the selenium compound may be selected from the selenites and the selenates. For example, it may be a selenite of an alkali metal, like a sodium selenite ($Na_2SeO_3$).

The matrix may comprise any inorganic or organic compound, possibly mixed, able to encapsulate efficiently the heart of selenium and/or selenium compound. By efficiently we intend to mean able to mask for a time not lower than 5 to 15 minutes the presence of selenium and its compounds from hot molten glass batches components, like $SiO_2$, $CaO$, $Na_2O$, $K_2O$, $Al_2O_3$ and the like. According to the invention, the matrix may comprise at least one of the following compounds: $SiO_2$, $Na_2O$, $K_2O$, $Li_2O$, $B_2O_3$, $CaO$, $MgO$, $BaO$, $ZnO$, $Al_2O_3$, $Fe_2O_3$, $Se$, $TiO_2$, $CoO$, $MnO$, $Cr_2O_3$, $CeO_2$, $ZrO_2$, $NiO$, $SnO_2$, $Cu_2O$, $V_2O_5$ and $SO_3$. Those compounds may be present as such in the matrix, or mixed or combined with others in order to form special components like sand, cement of any type, dolomite . . . and the like. Two or more of them may as well be mixed together.

According to an embodiment of the invention, the matrix is generally able to form an eutectic with one or more of molten $CaO$, $MgO$, $Na_2O$, $SiO_2$ or $Al_2O_3$ present in a raw material glass batch.

As mention above, a second aspect of the invention is to supply a process for the manufacture of pellets according to the invention. In that process:
- part of the total quantity of the matrix material is dry mixed
- the mixture is poured into a mould bearing an open cavity
- a rod having a cross section slightly smaller than the one of the cavity aperture is then inserted into the cavity and allowed to lay on the matrix material mixture
- the rod is then pressed with the aid of a press in order to solidify the matrix material into a lower half pellet
- the rod is removed and the selenium and/or selenium compound is deposited at the top centre area of the half pellet
- a second and last part of the quantity of the mixed matrix material is poured over the selenium and/or selenium compound
- the rod is put again in place inside the cavity of the mould and pressed
- the finished pellet is removed from the mold.

An embodiment of the process according to the invention consists of using two different rods, a first one with a plain section end for pressing the first lower half pellet and a second one with a small hole located in the centre of its section end in view to keep the selenium and/or selenium compound at the heart of the pellet during the pressing operation.

According to another interesting embodiment, a small proportion of a binding agent may be added to the selenium and/or selenium compound before it is pressed inside the matrix. This has the advantage of keeping the selenium and/or selenium compound inside the finished pellets at a distance from the external surfaces. The binding agent may be chosen from any tacky composition, preferably organic so as to allow its escape under the form of water vapour and $CO_2$ from the batch mixture by the action of heat. Water itself in small quantities can as well be used as a binding agent. Generally, the binding agent may be present in quantities of as low as 0.05% of the weight of the selenium and/or selenium compound and does not exceed a few percent of that weight. It is most often kept below 10% of that weight.

The invention also relates to the use of the pellets according to the invention for incorporating a molten glass batch in order to reduce the selenium burn off in the exhaust gas. It relates as well to a method of reducing selenium burn off in a selenium comprising glass-making process by incorporating at least part of the selenium raw material inside pellets compliant with the invention.

A last aspect of the invention is to provide a glass comprising selenium, which has been manufactured by the method detailed above. In a preferred embodiment, the glass is a soda lime glass. In another preferred embodiment, the soda lime glass comprising Se is a float glass obtained by floating a ribbon of molten glass on the upper surface of a bath of molten metal tin. The glass may also be, alternatively, any other type of glass including, non-limitatively: cast glass, drawn glass and blown cylinder glass.

Preferably, the soda lime float glass is a flat glass.

The invention will now be illustrated below by examples aiming at better describing the invention, without by no means trying to limit its scope.

Example 1R

Not in Accordance of the Invention

A first melting reference example (Example 1R) has involved a batch of raw materials comprising no pellet at all. The following solid components have been mixed in solid pulverulent form in the amount indicated:

TABLE 1

| Component | Amount, g |
|---|---|
| Sand | 139.117 |
| Feldspar | 4.744 |
| Slag | 2.116 |
| Limestone | 7.629 |
| Dolomite | 39.812 |
| Soda Ash | 42.889 |
| Salt cake | 1.763 |
| Niter | 1.539 |
| Rouge | 0.480 |
| $CoSO_4 \cdot 7H_2O$ | 0.030 |
| $Na_2SeO_3$ | 0.059 |

To those components was added 4% of the total weight of the batch of water in liquid form in order to ease the mix of the different solid components. After dry mixing of the batch solids, they have been poured into a ZAC (zirconia-alumina) crucible, the latter being inserted for 2 hours into a laboratory furnace filled with a reductive gaseous atmosphere consisting of a mixture of 95% nitrogen and 5% hydrogen, which has been preheated to 1400° C. The molten batch, which was become a molten glass, has then been casted on a cold plate and the resulting solid glass broken in small pieces. The pieces have then been inserted again in a crucible and placed in the furnace at 1400° C. The temperature was then increased up to 1450° C. at a rate of about 5° C./min. The molten glass has thereafter been casted, broken and inserted again in the furnace at 1450° C. The total duration of the stay at that temperature was about 2 hours. The temperature has thereafter been increased up to 1500° C. with the same rate of 5° C./min. The molten glass was thereafter maintained at that temperature for refining during about one hour, followed by a return to 1450° C. for thermal conditioning during about 1.5 hours.

At the end of the thermal conditioning period, the molten glass has been casted in small 4 cm×4 cm steel moulds, which were placed in an annealing furnace at 600° C. for 2.5 hours. The electric heating of the annealing furnace has thereafter been switched off and the temperature allowed to go down to ambient overnight.

The day after, glass samples were withdrawn from the moulds and their faces mechanically polished. Their chemical composition were thereafter analysed by the X-ray fluorescence technique and their remaining selenium yield computed by comparison with the amount initially added in the batch mixture.

The Se yield computation gave a result of 14%.

Example 2R

Not in Accordance of the Invention

In a second reference example (2R: mixed pellet), the composition "A" described in patent EP 0 618 177 A1 has been used for pressing one pellet that has been inserted in the middle of the raw materials solids in the same crucible as in example 1R.

The batch of raw materials and the pellet were of the following composition:

TABLE 2

| Component | Amount, g |
|---|---|
| Batch: | |
| Sand | 139.100 |
| Feldspar | 4.740 |
| Slag | 2.116 |
| Limestone | 7.629 |
| Dolomite | 39.812 |
| Soda Ash | 42.889 |
| Salt cake | 1.763 |
| Niter | 0.000 |
| Rouge | 0.469 |
| $CoSO_4 \cdot 7H_2O$ | 0.030 |
| $Na_2SeO_3$ | 0.000 |
| Mixed pellet: | |
| Niter | 0.840 |
| Sand | 1.840 |
| $KNO_3$ | 0.840 |
| $Ca(NO_3)_2 \cdot 4H_2O$ | 1.500 |
| $Na_2SeO_3$ | 0.059 |

The same procedure of melting, refining and annealing the glass has been performed as in example 1R. The measured Se yield has been, for this example, 12%.

Examples 3-5

According to the Invention

The same procedure as the one used in example 2R has been performed with modified pellets of three different natures. About half of the batch materials were carefully pressed so has to present a hollow cavity in the middle of the compressed mixture. The latter cavity has been subsequently filled with 0.059 g $Na_2SeO_3$ (encapsulated Se pellets) and covered with the remaining half of the batch materials. The whole pellet comprising the selenium compound in its centre has thereafter been pressed.

TABLE 3

| | Example 3 Clinker | | Example 4 Calcined dolomite | | Example 5 Calcined dolomite + sand | |
|---|---|---|---|---|---|---|
| Batch: | | | Batch: | | Batch: | |
| Sand | 139.500 | Sand | 139.500 | Sand | 136.600 |
| Feldspar | 4.740 | Feldspar | 4.740 | Feldspar | 4.740 |
| Slag | 2.116 | Slag | 2.116 | Slag | 2.116 |
| Limestone | 7.629 | Limestone | 7.629 | Limestone | 7.629 |
| Dolomite | 39.812 | Dolomite | 34.810 | Dolomite | 34.812 |
| Soda Ash | 42.889 | Soda Ash | 42.889 | Soda Ash | 42.889 |
| Salt cake | 1.763 | Salt cake | 1.763 | Salt cake | 1.763 |
| Niter | 1.539 | Niter | 1.539 | Niter | 1.539 |
| Rouge | 0.471 | Rouge | 0.471 | Rouge | 0.471 |
| $CoSO_4 \cdot 7H_2O$ | 0.030 | $CoSO_4 \cdot 7H_2O$ | 0.030 | $CoSO_4 \cdot 7H_2O$ | 0.030 |
| Encapsulated pellet: | | Encapsulated pellet: | | Encapsulated pellet: | |
| Clinker | 0.500 | Calcined Dolomite | 0.500 | Sand | 0.250 |
| | | | | Calcined Dolomite | 0.250 |
| $Na_2SeO_3$ | 0.059 | $Na_2SeO_3$ | 0.059 | $Na_2SeO_3$ | 0.059 |
| Se yield | 24% | Se yield | 28% | Se yield | 23% |

Yields in Se have been computed and indicated at the bottom of the table. It can be seen that by encapsulating selenium compounds inside pellets can increase the yield up to 100% compared to the references.

The invention claimed is:

1. A capsule pellet, consisting of:
   a heart comprising at least one of selenium or a selenium compound; and
   a matrix encapsulating the heart;
   wherein
   the matrix comprises a compressed material that does not melt at a temperature less than 1300° C. at normal pressure,
   the compressed material does not contain any compound which would be a gas at a temperature less than 200° C.,
   the compressed matrix material forms a eutectic product having a melting temperature in a range of 400° C. to 1800° C. at normal pressure with at least one material which is a conventional constituent of glass, and
   a length of the capsule pellet in a largest dimension is at least 0.5 cm.

2. The capsule pellet according to claim 1, wherein the at least one of selenium or a Se compound is selected from the group consisting of metallic selenium, an inorganic selenium salt, an organic selenium salt and an organic compound comprising selenium.

3. The capsule pellet according to claim 2, wherein the selenium compound is a selenite or a selenate.

4. The capsule pellet according to claim 1, wherein the matrix comprises at least one selected from the group of compounds consisting of $SiO_2$, $Na_2O$, $K_2O$, $Li_2O$, $B_2O_3$, CaO, MgO, BaG, ZnO, $Al_2O_3$, $Fe_2O_3$, Se, $TiO_2$, CoO, MnO, $Cr_2O_3$, $CeO_2$, $ZrO_2$, NiO, $SnO_2$, $Cu_2O$, $V_2O_5$ and $SO_3$.

5. The capsule pellet according to claim 4, wherein the matrix further comprises at least one material selected from the group consisting of sand, cement, dolomite and a mixture thereof.

6. The capsule pellet according to claim 1, wherein the conventional constituent of glass with which the matrix forms an eutectic product is at least one selected from the group consisting of CaO, MgO and $SiO_2$.

7. A process to manufacture the capsule pellet according to claim 1, comprising:
   dry mixing a total quantity of matrix material to obtain an initial mold mixture;
   splitting the initial mold mixture into two parts;
   pouring one part of the two parts of the initial mold mixture into a mold having an open cavity with an aperture with a cross section;
   inserting a rod having a cross sectional dimension which is smaller than the aperture of the mold cavity into the mold to contact the initial mold mixture;
   pressing the rod with the aid of a press against the initial mold mixture to solidify the initial mold mixture into a lower half of the capsule pellet;
   removing the rod from the mold cavity;
   depositing at least one of selenium or selenium compound in the mold cavity on a top center area of the lower half capsule pellet;
   pouring the remaining part of the initial mold mixture into the mold cavity;
   again inserting the rod;
   pressing the rod with the aid of a press to form the capsule pellet; and
   removing the capsule pellet from the mold.

8. The process according to claim 7, comprising two different rods, wherein
   a first rod having a plain section end for pressing the first lower half capsule pellet and
   a second rod having a small hole located a center of its section end to keep the selenium and/or selenium compound at the heart of the capsule pellet during the pressing operation.

9. The process according to claim 7, further comprising:
   adding a binding agent to the at least one of selenium or selenium compound.

10. The process according to claim 9, wherein the binding agent is a tacky organic composition, water or a combination thereof.

11. A method for preparing a selenium containing glass, comprising:

adding the selenium to the molten glass mixture as the capsule pellet according to claim 1.

12. A method of reducing selenium burn off in a selenium comprising glass-making process, comprising: incorporating at least part of the selenium raw material for the glass by adding the capsule pellet according to claim 1.

13. A soda lime glass comprising selenium, obtained by the method of claim 12.

14. The soda lime glass comprising selenium according to claim 13, wherein the glass is a float glass obtained by floating a ribbon of molten glass on an upper surface of a bath of molten metal tin.

15. A flat glass comprising selenium, wherein the flat glass is the float glass of claim 14.

* * * * *